United States Patent
Debevec et al.

(10) Patent No.: US 8,432,436 B2
(45) Date of Patent: Apr. 30, 2013

(54) RENDERING FOR AN INTERACTIVE 360 DEGREE LIGHT FIELD DISPLAY

(75) Inventors: Paul E. Debevec, Marina del Rey, CA (US); Andrew Jones, Los Angeles, CA (US); Mark Bolas, Los Angeles, CA (US); Ian McDowall, Woodside, CA (US)

(73) Assignee: University of Southern California, Los Angeles, CA (US)

( * ) Notice: Subject to any disclaimer, the term of this patent is extended or adjusted under 35 U.S.C. 154(b) by 1025 days.

(21) Appl. No.: 12/105,120

(22) Filed: Apr. 17, 2008

(65) Prior Publication Data
US 2008/0297593 A1    Dec. 4, 2008

Related U.S. Application Data

(60) Provisional application No. 60/912,370, filed on Apr. 17, 2007.

(51) Int. Cl.
*H04N 13/04* (2006.01)
(52) U.S. Cl.
USPC    348/51; 348/46; 348/E13.001; 348/E13.027; 348/E13.038; 348/E13.043; 353/31; 353/94; 359/464; 359/216.1
(58) Field of Classification Search ............. 348/51, 348/E13.001, E13.014, E13.027, E13.038, 348/E13.043; 353/31, 94; 359/464, 216.1
See application file for complete search history.

(56) References Cited

U.S. PATENT DOCUMENTS

| | | | | |
|---|---|---|---|---|
| 5,365,370 A | * | 11/1994 | Hudgins | 359/464 |
| 5,870,220 A | * | 2/1999 | Migdal et al. | 359/216.1 |
| 6,831,678 B1 | * | 12/2004 | Travis | 348/46 |
| 2003/0214633 A1 | * | 11/2003 | Roddy et al. | 353/31 |
| 2004/0227948 A1 | | 11/2004 | Debevec et al. | |
| 2005/0276441 A1 | | 12/2005 | Debevec | |
| 2006/0256302 A1 | * | 11/2006 | Hsu | 353/94 |

OTHER PUBLICATIONS

International Search Report for PCT Application Serial No. PCT/US08/60658, mailed on Dec. 9, 2008.
Debevec Paul, Hawkins Tim, Tchou Chris, Duiker Haarm-Pieter, Sarokin Westley, Acquiring the reflectance field of a human face, SIGGRAPH 2000 Conference Proceedings, University of California at Berkeley.

(Continued)

*Primary Examiner* — Kyung H Shin
(74) *Attorney, Agent, or Firm* — McDermott Will & Emery LLP

(57) ABSTRACT

An interactive, autostereoscopic system for displaying an object in 3D includes a mirror configured to spin around a vertical axis when actuated by a motor, a high speed video projector, and a processing system including a graphics card interfaced to the video projector. An anisotropic reflector is bonded onto an inclined surface of the mirror. The video projector projects video signals of the object from the projector onto the inclined surface of the mirror while the mirror is spinning, so that light rays representing the video signals are redirected toward a field of view of a 360 degree range. The processing system renders the redirected light rays so as to interactively generate a horizontal-parallax 3D display of the object. Vertical parallax can be included in the display by adjusting vertically the displayed views of the object, in response to tracking of viewer motion by a tracking system.

20 Claims, 7 Drawing Sheets

OTHER PUBLICATIONS

Debevec Paul, Wenger Andreas, Tchou Chris, Gardner Andrew, Waese Jamie, Hawkins Tim, A lighting reproduction approach to live-action compositing, SIGGRAPH 2002, San Antonio, Jul. 21-26, 2002, University of Southern California Institute for Creative Technologies.

Gardner Andrew, Tchou Chris, Hawkins Tim, Debevec Paul, Linear light source reflectometry, University of Southern California Institute for Creative Technologies Graphics Laboratory.

Wegner Andreas, Gardner Andrew, Tchou Chris, Unger Jonas, Hawkins Tim, Debevec Paul, Performance relighting and reflectance transformation with time-multiplexed illumination, University of Southern California Institute for Creative Technologies.

* cited by examiner

RENDERING FOR AN INTERACTIVE 360 DEGREE LIGHT FIELD DISPLAY

CROSS-REFERENCE TO RELATED APPLICATIONS

This application claims the benefit of priority under 35 U.S.C. §119(e) from U.S. Provisional Application Ser. No. 60/912,370 entitled "An Interactive 360 Degree Horizontal Parallax Light Field Display" and filed on Apr. 17, 2007, by inventor Paul E. Debevec. The provisional application Ser. No. 60/912,370 is incorporated herein by reference in its entirety.

STATEMENT REGARDING FEDERALLY SPONSORED RESEARCH

This invention was made with government support under Grant No. W911NF-04-D-0005, awarded by the U.S. Army Research Office. The government has certain rights in the invention.

BACKGROUND

A great deal of computer generated imagery is modeled and rendered in 3D (three dimensions). The vast majority of 3D imagery is shown on 2D displays, however. Only relatively recently have the requisite enabling technologies become available that can offer the promise of making functional and practical 3D displays possible.

Many problems and challenges remain in this field. As one example, rendering 3D displays of scenes with both the correct horizontal and vertical perspectives remains a challenge. Another problem that has not yet been addressed is how to achieve 3D displays that are interactive so as to allow real time updates to the displayed images.

There is a need for improved methods and systems for 3D displays that can among other things address the problems and challenges mentioned above.

SUMMARY

An interactive, autostereoscopic system for displaying an object in three dimensions includes a mirror configured to spin around a vertical axis when actuated by a motor, a high speed video projector, and a processing system including a graphics card interfaced to the video projector. An anisotropic reflector is bonded onto an inclined surface of the mirror. The video projector projects video signals of the object from the projector onto the projection surface while the mirror is spinning, so that light rays representing the video signals are redirected toward a field of view of a 360 degree range within a viewing space of one or more viewers. The processing system renders the redirected light rays so as to generate a horizontal-parallax 3D display of the object for the viewers from any of a plurality of viewing directions within the viewing space.

DETAILED DESCRIPTION

The present disclosure describes an easily reproducible, low-cost 3D display system with a form factor for displaying 3D objects in 3D. Also described are the projection mathematics and rendering methods necessary to drive the 3D display with real time raster imagery or pre-recorded light fields so that they exhibit the correct cues of both horizontal and vertical parallax. The display is autostereoscopic, requiring no special viewing glasses, and omnidirectional, allowing viewers to be situated anywhere around it. The display is also multiview, i.e. produces a correct rendition of the light field with the correct horizontal parallax and vertical perspective for any viewpoint situated at a certain distance and height around the display. If head tracking is employed to detect the height and distance of one or more of the viewers around the display, the projection equations described below allow the vertical parallax to be adjusted on the fly to allow the tracked users to properly see objects from arbitrary heights and distances, in addition to obtaining correct views from any angle around the display. The systems and methods described below use primarily commodity graphics and display components and achieve real-time rendering with non-trivial scene complexity across its entire field of view.

Autostereoscopic 3D Display System

Figure 1:
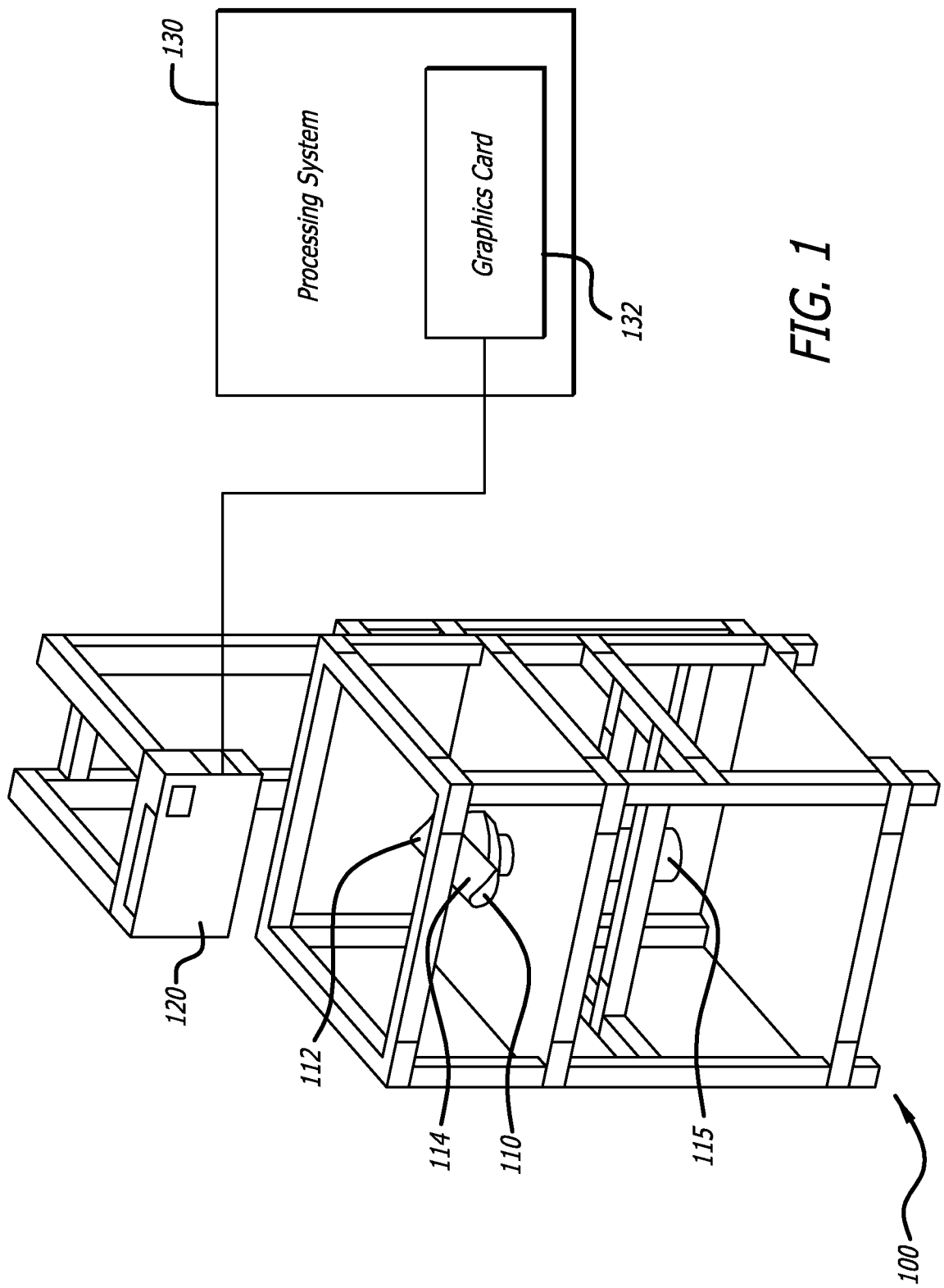
FIG. 1 illustrates a system for generating an autostereoscopic, multiview (horizontal-parallax-only) 3D display of an object, in one embodiment of the present disclosure.

FIG. 1 illustrates a system for generating an autostereoscopic 3D display of an object, in one embodiment of the present disclosure. The 3D display system 100 includes: a mirror 110 covered by an anisotropic reflector 112, a motion-control motor 115, a high-speed video projector 120, and a processing system 130 (for example a standard PC) that includes a graphics card 132 interfaced to the video projector 120 using a custom FPGA-based image decoder. The mirror 110 is configured to spin with respect to a vertical axis, when actuated by the motion-control motor 115. The spinning mirror 110 may be tilted or inclined at an angle with respect to the vertical axis, for example by about 45 degrees, to reflect rays of light from the projector 120 to all possible viewing positions around the device, allowing many viewers to view the display simultaneously.

In one embodiment, illustrated in FIG. 1, the video projector 120 achieves high-speed projection by modifying an off-the-shelf projector to use a new DLP drive card with custom programmed FPGA-based circuitry. The FPGA decodes a standard DVI signal from the graphics card 132. Instead of rendering a color image, the FPGA takes each 24-bit color frame of video and displays each bit sequentially as separate frames. Thus, if the incoming digital video signal is 60 Hz, the video projector 120 displays 60×24=1,440 frames per second. To achieve even faster rates, the video card refresh may be set to rates of about 180-240 Hz. At 200 Hz, the video projector 120 displays 4,800 binary frames per second. The processing system 130 (containing the graphics card 132) continuously renders new horizontal views of the subject, which in the illustrated embodiment consists of 288 images per rotation of the mirror. These views are encoded into 24-bit images and sent to the video projector 120. A complete kit consisting of the FPGA and DLP boards is now available from Polaris Road, Inc.

The anisotropic reflector 112 is a holographic diffuser is bonded onto a surface of the mirror 110. In one embodiment, illustrated in FIG. 1, the anisotropic reflector 112 is a holographic diffuser. Other embodiments of the present disclosure may use different types of anisotropic reflectors, including but not limited to: a lenticular lens; and a lenslet array. The mirror surface (with the anisotropic reflector bonded thereon) provides a projection surface 114, which reflects each projector pixel to a narrow range of viewpoints. In other words, the mirror surface (onto which the anisotropic reflector bonded) provides a projection surface that reflects incident rays of light in a way that the rays are spread in a substantially vertical direction after being reflected. This configuration contrasts with previous volumetric displays, which projected images onto a spinning diffuse plane which scattered light in all directions. Such displays could not recreate view-dependent effects such as occlusion.

The holographic diffuser 112 provides control over the width and height of this region. In the illustrated embodiment, the characteristics of the holographic diffuser 112 are such that the relative diffusion between x and y is approximately 1:200. Horizontally, the surface 114 is sharply specular to maintain a 1.25 degree separation between views. Vertically, the mirror 110 scatters widely so the projected image can be viewed from essentially any height.

Figure 2:
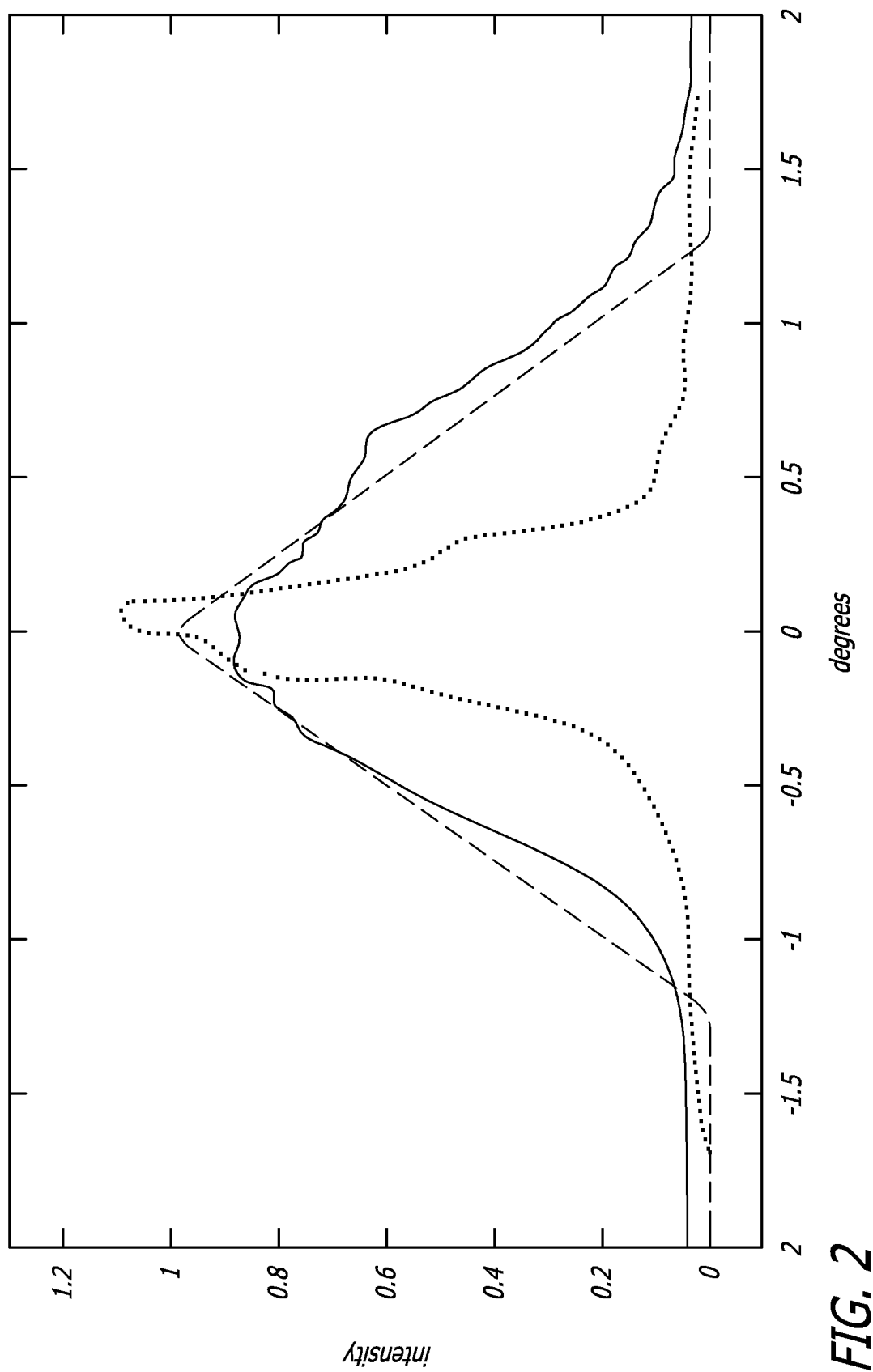
FIG. 2 illustrates the anisotropic reflectance characteristics of the mirror system illustrated in FIG. 1.

FIG. 2 shows the anisotropic reflectance characteristics of the mirror system (i.e. the mirror 110 coupled to the motor 115 and having the holographic diffuser 112 bonded to a surface of the mirror 110). The horizontal profile of the specular lobe approximates a bilinear interpolation between adjacent viewpoints. The motion of the mirror may add some additional blur which improves reproduction of halftoned imagery at the expense of angular resolution. The holographic diffuser may be diffuse in the vertical dimension and sharply specular in the horizontal dimension. In the graph shown in FIG. 2, the dotted line plots the intensity of a laser beam as reflected by the holographic diffuser 112 and mirror 110 toward the viewers. The solid line illustrates the intensity of a thin vertical line of light from the video projector as reflected by the holographic diffuser 112 and mirror 110 toward the viewers. Finally, the dashed line illustrates the intensity of an ideal bilinear interpolation spread of a hat function whose radius matches the 1.25 degree angular separation of the successive views of the display system 100.

The anisotropic holographic diffuser 112 and mirror 110 may be mounted on a carbon fiber panel and attached to an aluminum fly-wheel at 45°, in the illustrated embodiment. The flywheel spins synchronously relative to the images displayed by the video projector 120.

In one embodiment, the system 100 may be synchronized as follows. Since the output frame rate of the PC graphics card is relatively constant and cannot be fine-tuned on the fly, we use the PC video output rate as the master signal for system synchronization. The projector's FPGA also creates signals encoding the current frame rate. These control signals interface directly to an Animatics SM3420D "Smart Motor" which contains firmware and motion control parameters resulting in a stable, velocity-based control loop that ensures the motor velocity stays in sync with the signals from the projector. As the mirror rotates up to 20 times per second, persistence of vision creates the illusion of a floating object around the center of the mirror.

The projector and spinning mirror yield a horizontal-parallax-only display; the image perspective does not change correctly as the viewpoint moves up and down, or forward and backward. However, the projection algorithms described further below can take into account the height and distance of the viewer to render the scene with correct perspective.

If just horizontal parallax is required, a sensible course of action is to initialize this height and distance to the expected typical viewing height and distance. Since the display system described above can be implemented interactively, using the graphics card we can achieve both horizontal and vertical parallax display by using a tracking system to measure the user's height and distance.

The 3D, horizontal-parallax-only display may be augmented to include correct vertical parallax in the display. In overview, correct vertical parallax may be included by tracking the motion of one or more viewers, then interactively updating the displayed images of the object in response to the tracked motion of the one or more viewers. In an embodiment in which the motion of one viewer is tracked, the displayed images of the object may be interactively updated in such a way that when the viewer is moving upward from below, the displayed image of the object appears to the viewer as if seen from above, and when the viewer is moving downward from above the displayed image of the object appears to the viewer as if seen from below. In an embodiment in which the motions of a plurality of viewers are tracked, the displayed images of the object may be interactively updated in such a way that the images of the object as displayed to each viewer is shown from a viewpoint consistent with the height of each viewer relative to the display.

To include correct vertical parallax, a tracking system is thus used, for example where the viewer holds the tracking device (a sensor) to their temple, or to a video camera filming the display. Any motion tracking system known in the art may be used. In one embodiment, the tracking system may be an electromagnetic motion tracking device, such as a Polhemus Patriot electromagnetic tracking device that can track the motion of a viewer when held by or attached to the viewer. In another embodiment, the tracking system may include one or more video cameras. In this embodiment, a plurality of video cameras may be used to observe a plurality of viewers, so that the position of each of the viewers can be determined. In yet another embodiment, the tracking system may include a plurality of depth cameras used to track the position of a plurality of viewers.

The tracking data may used by the projection algorithm (further described below) to display the scene from the correct perspective for the viewer's height and distance. In this way, the display's horizontal parallax provides binocular stereo and yields zero lag as the viewer moves his/her head horizontally, which may be one of the most common significant head motions. The effects of vertical motion and distance change are computed based on the tracked position. The display only needs to adjust the rendered views in the vicinity of each tracked user, leaving the rest of the displayed circumference optimized to the average expected viewer position.

Figure 3C:
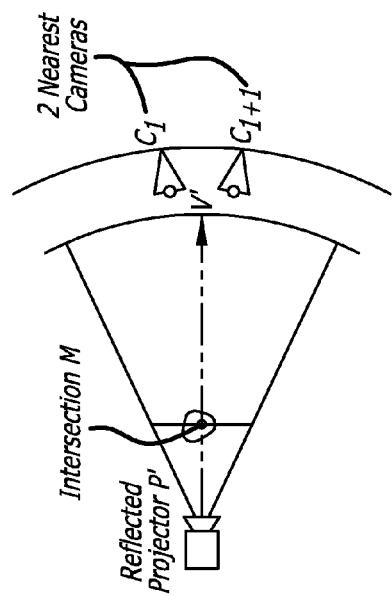
FIGS. 3A, 3B, and 3C illustrate a projection process and geometry for rendering an object or scene to the system illustrated in FIG. 1, in one embodiment of the present disclosure.
Figure 3B:
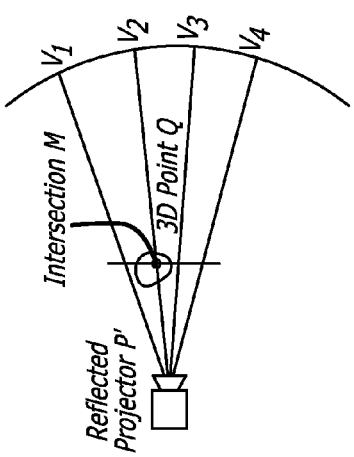
Figure 3A:
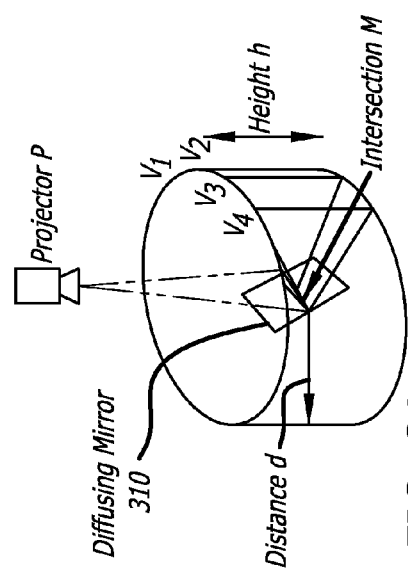

FIGS. 3A, 3B, and 3C illustrate projection process and geometry for rendering an object and/or a scene to the system illustrated in FIG. 1, in one embodiment of the present disclosure.

In these figures, it is assumed that the spinning mirror (labeled as 110 in FIG. 1, re-labeled as 310 in FIG. 3A) is centered at the origin and that its axis of rotation is the vertical y-axis, with the video projector at the nodal point P above the mirror, as shown in FIG. 3A. It is further assumed that the viewpoint for which the correct perspective should be obtained is at a height h (relative to the center of the projection surface 114) and a distance d from the y- or vertical axis about which the mirror 310 rotates when actuated by the motion-control motor.

By the rotational symmetry of the 3D system described above, perspective-correct imagery can be produced for any viewing position on a viewing space or viewing circle V defined by h and d. This yields binocular images for a viewer facing the display since h and d will be similar for both eyes. A particular viewpoint on the circle V is denoted in the present disclosure as V'. In practice, the set of perspective-correct viewpoints V need not be a continuous planar circle and can pass through a variety of tracked viewer positions at different distances and heights.

At any given instant, with the spinning anisotropic mirror 310 frozen at a particular position, the 2D image projected onto the mirror is reflected out into space, covering parts of the field of view of many viewpoints on the viewing space V, as shown in FIG. 3B. Since the mirror 310 provides little horizontal diffusion, each projector pixel (u, v) sends light toward one specific viewpoint V' on V. The display system must ensure that each projected pixel displays the appropriate part of the scene as it should be seen from viewpoint V'. Thus, there are two questions that must be answered: First, for a 3D point Q in a scene, what is the corresponding projector pixel (u, v) that reflects to the correct viewpoint V' along the ray $\overrightarrow{QV'}$? Second, for a given projector pixel (u, v), which ray should be traced into the scene so that the display projects the correct ray intensity? The first answer tells us how to render 3D geometric models to the display and the second answer tells us how to render ray-traceable scenes such as light fields.

Projecting from the Scene into the Projector

If the scene being rendered is a polygonal 3D model, it must be determined, for any world-space vertex Q, where it should be rendered on the projector's image for any given mirror position. To visualize this process, the 3D display system is considered as it would be viewed from above. It is noted that in the horizontal plane, the anisotropic mirror behaves in essence like a regular mirror. The optical path can thus be unfolded by reflecting the projector position P to P' across the plane of the mirror 310, as seen in FIG. 3B. A ray originating at P' passing through Q will continue out into space toward the viewers. This ray $\overrightarrow{P'Q}$ will not, in general, intersect the view circle V. By assuming that the mirror diffuses rays into a vertical plane, the vertical plane containing $\overrightarrow{P'Q}$ is intersected with the viewing circle V, to determine the viewpoint V' from which Q will be seen with the mirror at its given position. As explained in Appendix A to this disclosure, this diffusion plane is an approximation to a cone-shaped reflection from the mirror, but the projection error is small for the setup described above, and may be neglected in practice.

A ray is then traced from the viewpoint V' toward Q, until it intersects the surface of the mirror at M. The symbol M represents the one point on the mirror that reflects light to the viewer coming from the direction of Q. To draw onto this point from the projector, M simply needs to be projected up toward the projector's nodal point P to find the corresponding projector pixel (u, v). Thus, illuminating a pixel at (u,v) will make it appear from viewpoint V' that 3D point Q has been illuminated. Q will eventually be rendered as it should be seen from all other viewpoints on V as the mirror rotates.

With these few geometric intersections, it can be determined for any 3D point Q where it should be drawn on the projector for each position of the mirror. Seen on the display by a viewer, the observed images exhibit correct perspective projection. The above-described technique actually renders multiple-center-of-projection (MCOP) images to the projector which can not be generated using a traditional projection matrix. Specifically, the projection technique implemented by the processing system 130 (shown in FIG. 1) uses a combination of two different viewpoints P (for horizontal coordinates) and V' (for vertical coordinates). Nonetheless, the technique may easily be implemented as the vertex shader provided in Appendix B of the present disclosure, allowing an entire mesh to be rendered in a single pass. For z-buffering, vertex depth may be based on the distance from V' to Q.

In the above-described MCOP projection, long straight lines should naturally appear curved in the projection. Thus, models with large polygons should be tessellated; alternatively, a fragment shader could discard incorrect pixels that lie outside the triangle.

Ray Tracing from the Projector into the Scene

If the scene to be displayed (such as a light field) is most easily ray-traced, it must be determined for each projector pixel (u, v) which ray in space—from the viewer toward the scene—corresponds to that pixel. The reflected projector position in FIG. 3B is again used, and a ray is projected from P' through its corresponding pixel (u, v) to where it intersects the surface of the mirror at point M. Upon intersecting the diffuser, it is assumed that this ray P'M spreads into a vertical fan of light which intersects the circle of views V at V'. Seen from above, this intersection is easily calculated as a 2D line-circle intersection.

It can now be seen that projector pixel (u, v) reflects from mirror point M toward viewpoint V'. Thus, the color it should display should be the result of tracing a ray from V' toward point M. If the scene being rendered is a light field, ray V'M is simply queried for the scene radiance at that point, as further described below.

The fans of light from a given projector frame diverge horizontally toward multiple viewpoints. As the mirror rotates, each viewpoint around the display sees a vertical line that scans out pixels from numerous projected MCOP images to form a single perspective image. The formation of these slices may be captured using a high-speed camera. The number of slices that make up an observed image depends on the viewpoint's distance from the display. This may be tested by projecting a sequence of alternating all-black and all-white images, allowing the number of images contributing to any one viewpoint to be counted easily. Closer to the mirror, the number of images that contributes to the view increases. As the viewpoint recedes, the number of images contributing to a view decreases to a minimum of approximately ten. This number never drops to one since our video projector is not orthographic.

Simpler techniques than those described above may be used to project imagery to the display, but they typically do not achieve correct perspective.

Geometric Calibration

Figure 4:
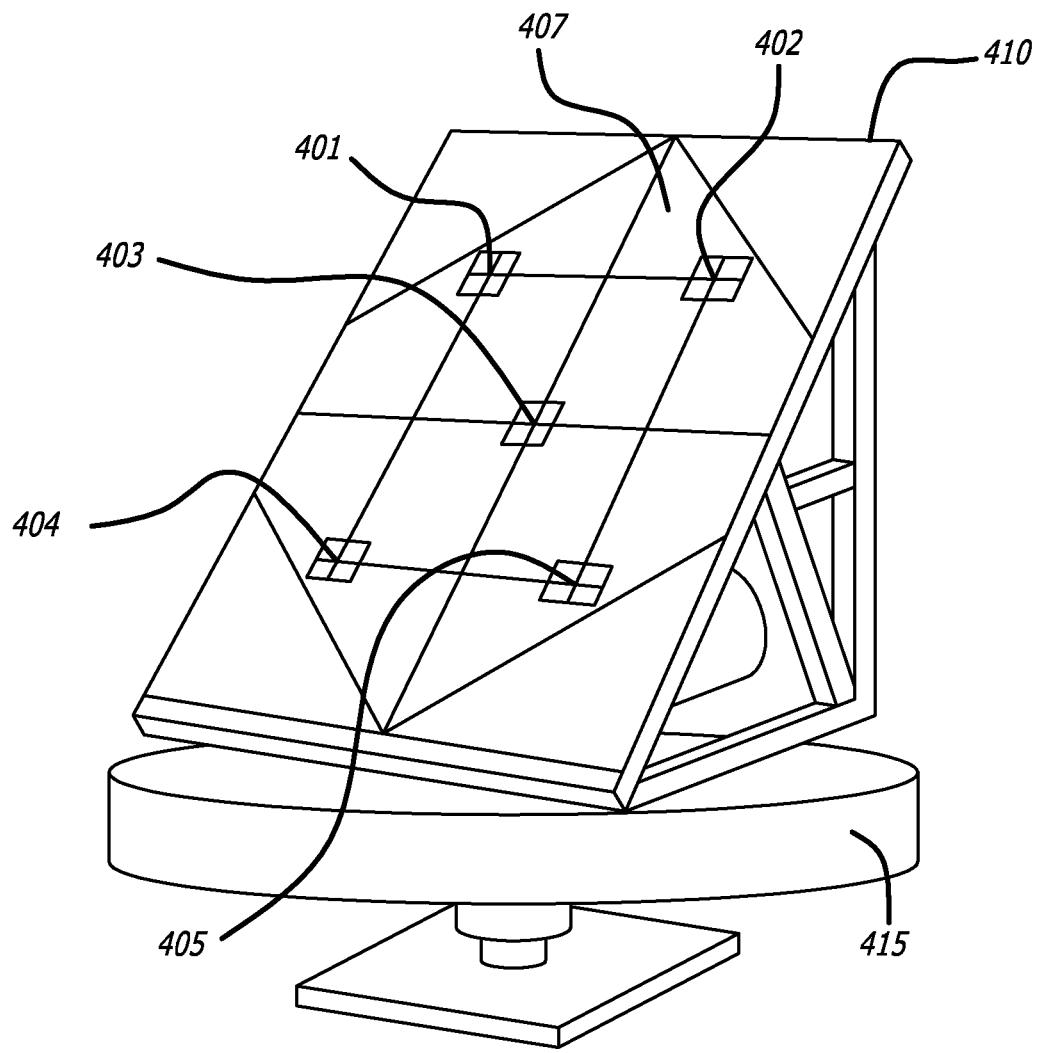
FIG. 4 illustrates a geometric calibration for the system illustrated in FIG. 1, in one embodiment of the present disclosure.

FIG. 4 illustrates a geometric calibration process for the system illustrated in FIG. 1, in one embodiment of the present disclosure.

The projection process described above (in conjunction with FIGS. 3A, 3B, and 3C) requires knowledge of the intrinsic projector parameters and its pose relative to the spinning mirror. The world coordinates are chosen to originate at the center of the mirror, with the vertical axis (0,1,0) oriented along the mirror's axis of rotation. Calibration is relatively straightforward as only a single projector is used, and an optical path is used with a single rotating element.

In the embodiment illustrated in FIG. 4, a simple and known linear calibration approach is used. This method requires at least 6 correspondences between known 3D points and their transformed 2D pixel positions. Radial lens distortion is ignored, in one embodiment, as this was measured to be insignificant. In this approach, known 3D positions are indicated by marking fixed points on the mirror surface. With the motor off, the mirror is positioned so that it faces the front of the display. A paper calibration target is attached that consists of five fiducial markers (401, 402, 403, 404, 405) on a surface 407 of a mirror 410, as seen FIG. 4. The mirror 410 spins when actuated by a motor 415, by analogy to the mirror 110 described in conjunction with FIG. 1.

A centered crosshair pattern is projected from the projector so that it can be positioned directly above the center fiducial. In this embodiment, the video projector (not shown in FIG. 4; shown and labeled as 120 in FIG. 1) is mounted so that its central projected pixel projects down vertically. A mouse may be used to move the crosshair to each of the other fiducial markers, clicking the mouse to obtain the position of the corresponding projector pixel. The mirror 410 is then rotated 180°, and then the four fiducials are clicked again, obtaining a total of eight 2D points. The eight fiducial positions form a unit cube in space.

Dynamic Rendering of 3D Display from 4D Light Field Data Set

Using the ray tracing projection described above in conjunction with FIGS. 3A, 3B, and 3C, 4D (four dimensional) light fields may be captured, preprocessed, and dynamically rendered to the display system described above, with correct horizontal and vertical parallax.

Figure 5:
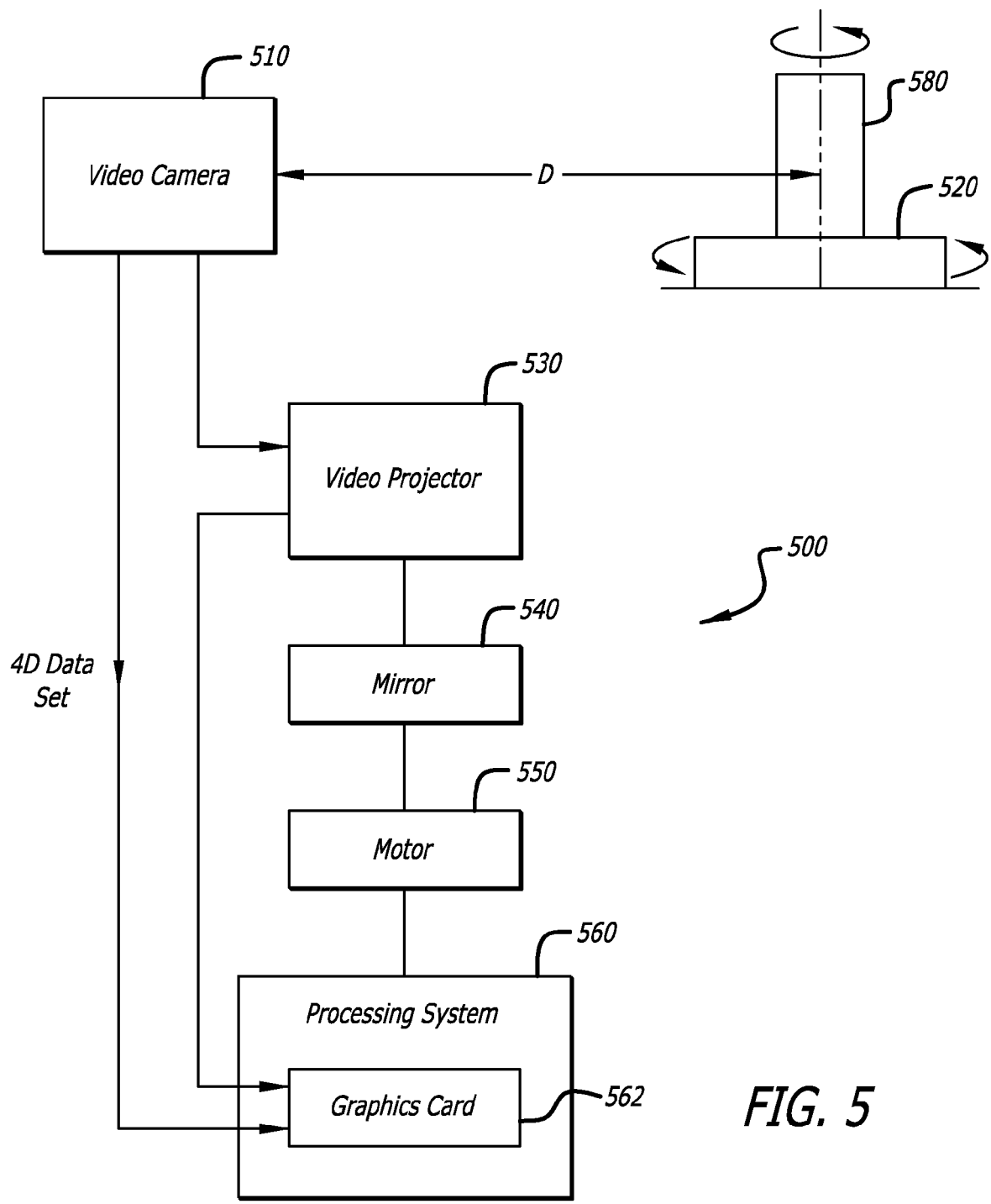
FIG. 5 illustrates a system for dynamic rendering of a 3D display from a photographically captured 4D light field data set, in one embodiment of the present disclosure.

FIG. 5 is a schematic block diagram of a system 500 for dynamic rendering of a 3D display from a photographically captured 4D light field data set, in one embodiment of the present disclosure. In overview, the system 500 includes a video camera 510, a motorized turntable 520 that rotates around an axis of rotation 522 when actuated, a high speed video projector 530, a mirror 540 configured to spin when actuated by a motion-control motor 550, and a processing system 560 that contains a graphics card 562 interfaced to the video projector 530.

As a first step, the system 500 captures a 4D light field of a real object 580 (that is to be rendered). In the illustrated embodiment, the object 580 is placed on the motorized turntable 520. The video camera 510 is placed at a distance D in front of the object. In the illustrated embodiment, D may be about 1.0 m, although D may of course be varied in different embodiments of the present disclosure. The object 580 is lit, for example with ambient light and/or lights attached to the turntable 520 or elsewhere, so that in one embodiment, the object 580 and its illumination remain substantially in the same relationship to each other during the rotation of the turntable 520 and the object 580.

In the illustrated embodiment, the video camera 510 captures a movie sequence of at least 288 frames of the object 580 rotating 360° on the turntable 520. This takes a few seconds. In one embodiment, the system 500 may capture a full 4D light field by shooting (with the video camera 510) multiple rotations of the turntable 520, raising the camera's height H by about 1.25 cm for each successive rotation. The intrinsic parameters for the camera may be calibrated, the and its pose may be recorded for each rotation.

Preprocessing the Light Field

As explained above, regular perspective images shown directly on the projector may not produce correct perspective to viewers around the display. Thus, the processing system 560 pre-processes the light field to produce images appropriate for projection. First, the object 580 and display coordinate systems are aligned by placing the origin at a point within the center of the object directly above the center of the turntable. The y axis is aligned to the turntable's axis of rotation 522.

Then, for each slice i of the captured light field taken from height $H_i$, a new, rebinned, light field slice is generated as follows. The virtual viewing space or viewing circle V is placed around the display at height $H_i$ and distance D. Then, for each of the 288 mirror positions, rays are traced from the reflected projector at P' through each pixel (u, v) to the mirror at M through to the view-point V' on V and then back toward M as described above in conjunction with FIGS. 3A-3C. The light field then simply needs to be queried for its radiance along ray $\overrightarrow{V'M}$. This is a simple query since V was chosen to be coincident with the height and distance of the current slice of the light field: V' thus lies on or between two of the same slice's camera locations $C_i$ and $C_{i+1}$ as in FIG. 3C. To obtain the final pixel value, one only needs to bilinearly interpolate between the pixels from $C_i$ and $C_{i+1}$ that look toward point M on the mirror.

For the display, the rebinned slices are then dithered to create binary images. Sets of 24 halftoned images are packed into 24-bit color images. As there are 288 images in each rebinned slice, this yields twelve 24-bit color images per row. At 768×768 resolution, one slice requires just over 20 MB of texture memory, allowing a light field resolution of over 768× 768 pixels by 288×32 views to be stored on a modern 768 MB graphics card.

By construction, each one of the rebinned light field slices yields correct perspective when projected on the display and observed anywhere from the original slice's height $H_i$ and distance D. If the viewer distance remains near distance D, one could produce accurate vertical parallax by swapping which slice is displayed according to the user's height. To render the light field accurately for any height and distance, a dynamic rebinning process is used as described below.

Dynamic Rebinning for Vertical Parallax

Figure 6B:
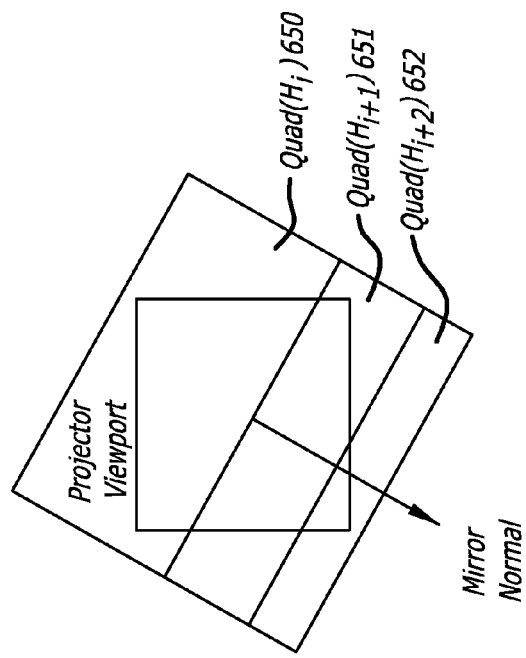
FIGS. 6A-6B illustrate dynamic vertical rebinning to generate correct vertical parallax for a horizontal-parallax-only 3D display of a photographically captured 4D light field data set, in one embodiment of the present disclosure.
Figure 6A:
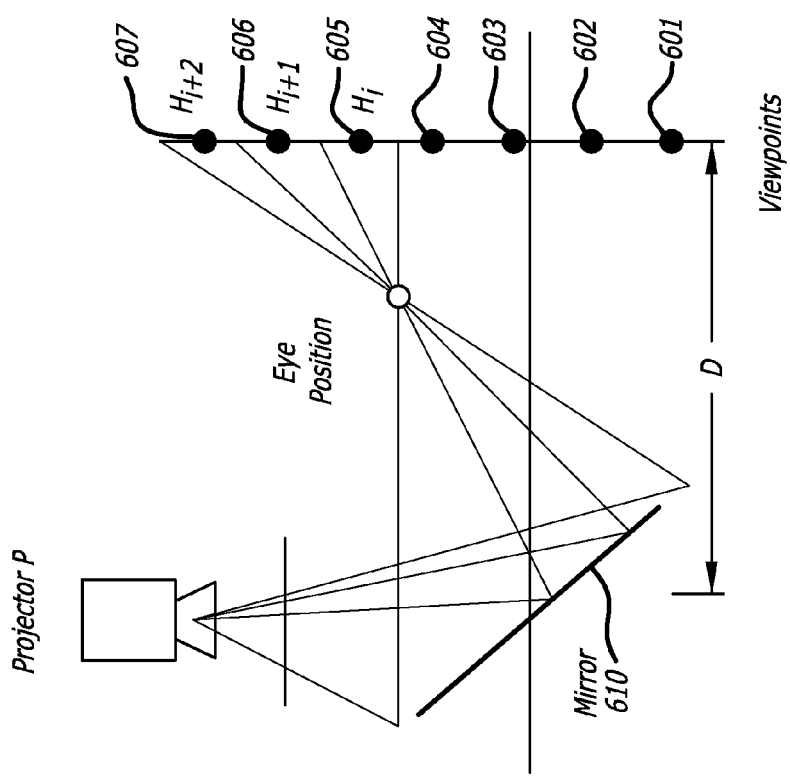

FIGS. 6A-6B illustrate dynamic vertical rebinning to generate correct vertical parallax for a horizontal-parallax-only 3D display of a photographically captured 4D light field data set, in one embodiment of the present disclosure.

In the illustrated embodiment, a dynamic vertical rebinning is performed that samples from different preprocessed light field slices based on the viewer's height h and distance d to produce correct horizontal and vertical perspective on the light field for any viewpoint. For each mirror position, each slice i's nodal point is considered at distance D and height $H_i$ in front of the mirror as shown in FIG. 6A. FIG. 6A shows vertical light field rebinning that is performed by projecting the light field slice closest in angle to the viewpoints (601, 602, 603, 604, 605, 606, and 607) onto each area of the mirror 610. The midpoints between the slices are projected through the viewer position onto the mirror, and then up into the projector image. These projected midpoints form an axis of points crossing the center of the projector image. Lines from each point are extended perpendicularly to this axis, dividing the projector's image into a set of regions or areas 650, each one corresponding to the area for which light field slice i contains the rays that most closely correspond to the viewpoint's view of the scene over that area.

The regions are delimited as quadrilaterals (650, 651, and 652) that extend wide enough to cover the image as seen in FIG. 6B. FIG. 6B shows that these projected regions define textured quadrilaterals (650, 651, 652) on the mirror surface. For each quadrilateral, a texture-mapped polygon is rendered that copies over the corresponding region from each light field slice. A projected image may be built up from these different slices. The areas corresponding to different original slices may be made visible by inverting every other quadrilateral of the dynamically rebinned projector frame.

If the viewer is close to distance D from the display, just one or two light field slices will constitute the projected images. As the viewer moves forward or back from D, the number of slices used will increase. Since the images on the graphics card are already dithered, no blending is performed between the slices. However, the seams between the slices may not be noticeable if the light field is of sufficient vertical angular resolution.

Instead of using the graphics card's memory to store multiple vertical slices of an object's light field, multiple temporal samples may be stored of a horizontal-parallax-only light field. For example, photographs from a 25-frame animated light field may captured and rendered using a known flowed reflectance field rendering technique. Alternatively, light fields from multi-camera systems could be used, or a high-speed single-camera system using a spinning mirror to vary the viewpoint could be used to capture such data.

Displaying Color Imagery

A number of methods may be used to display color imagery. A straightforward method to create a color version of the above-described 3D display may use a 3-chip DMD projector.

Figure 7:
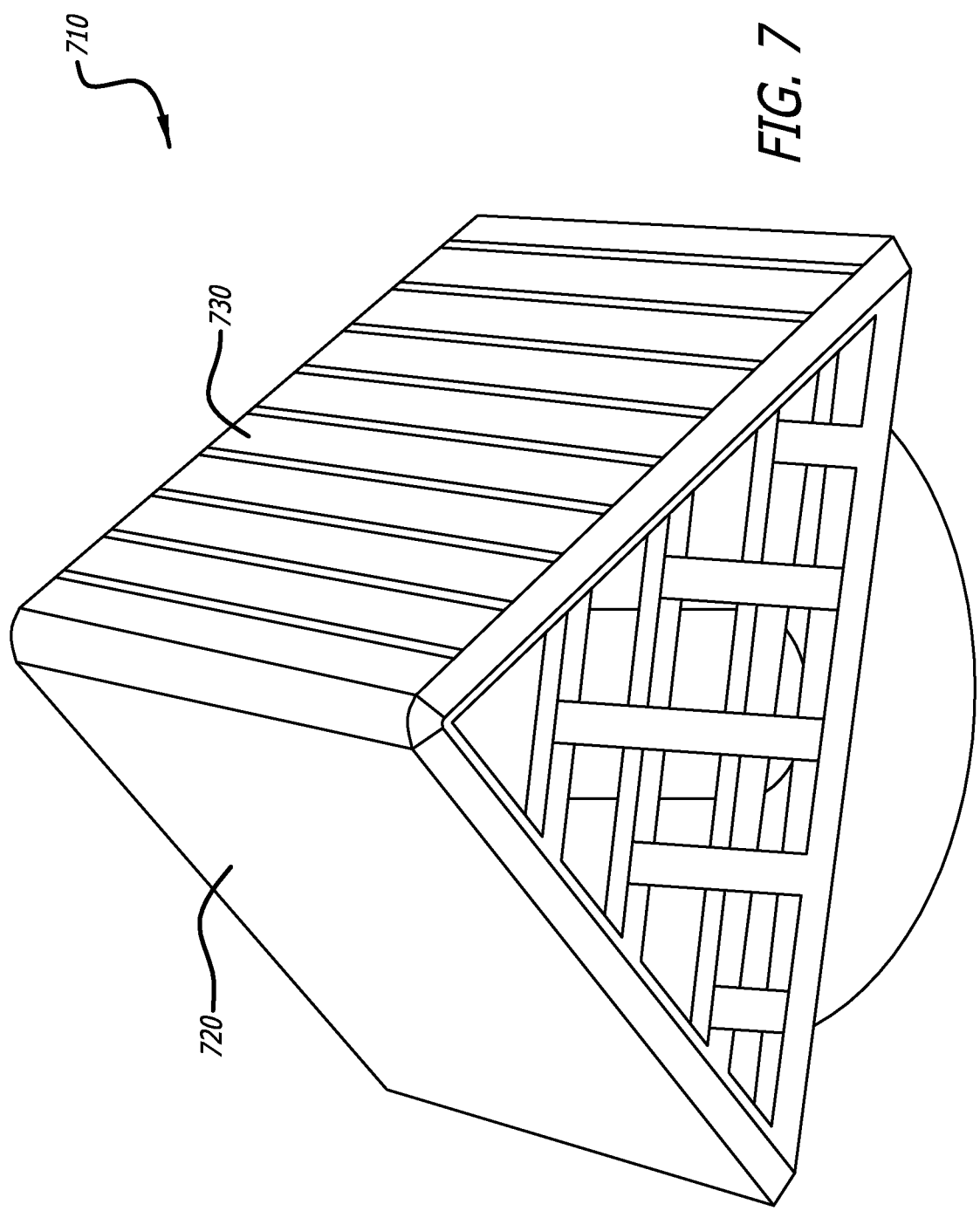
FIG. 7 illustrates a two-mirror tent for displaying two-toned color imagery using orange and cyan filters below the diffusers.

Alternatively, a two-channel field-sequential color system may be implemented using a two-sided tent-shaped diffusing mirror 710 shown in FIG. 7. For each side of the tent, a color filter may be placed between a holographic diffusing film and a first-surface of the mirror 710. This avoids introducing specular first-surface reflections. In one exemplary embodiment, a Lee #131 cyan filter may be chosen for one side 720 of the mirror 710 and a Lee #020 orange filter (symbolically illustrated with stripes) for the other side 730, dividing the visible spectrum approximately evenly into short and long wave-lengths. The RGB (red, blue and green) colors may be converted to Orange-Cyan colors by projecting the linear RGB vector onto the plane spanned by the Orange and Cyan colors.

To render in color, each plane of the tent mirror may be calibrated independently as described earlier. Then, the 3D scene may be rendered twice for each sub-frame, once for the orange side and once for the cyan side. The calibration process ensures that each side is rendered toward the appropriate set of viewpoints. The effect for the viewer is similar to the Kinemacolor 2-color cinema system, and the choice of filters allows for useful color reproduction for many scenes. Besides achieving color, the tent-mirror system doubles the number of images per second shown to the viewers, allowing a 40 Hz field-sequential color frame rate which appears significantly more stable than 20 Hz monochrome. Additional color channels and/or update rates may be achieved using additional mirrors in the arrangement, making the set of mirrors resemble a multi-sided pyramid.

In sum, methods and systems have been described that allow an autostereoscopic light field display to present interactive 3D graphics to multiple simultaneous viewers 360 degrees around the display, including rendering techniques used to generate the imagery on the display. Using a standard programmable graphics card, over 5,000 images per second of interactive 3D graphics may be rendered, projecting 360-degree views with 1.25 degree separation up to 20 updates per second. The system's projection geometry and its calibration process have been described. A multiple-center-of-projection rendering technique has been presented for creating perspective-correct images from arbitrary viewpoints around the display.

The projection techniques described in the present disclosure allow correct vertical perspective and parallax to be rendered for any height and distance when these parameters are known, and this effect may be demonstrated with interactive raster graphics using a tracking system to measure the viewer's height and distance. Finally, the projection techniques described in the present disclosure have been applied to the display of photographed light fields with accurate horizontal and vertical parallax.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of what is disclosed above. Thus, the apparatuses and methods described above are not intended to be limited to the embodiments shown herein, but are to be accorded the full scope consistent with the claims, wherein reference to an element in the singular is not intended to mean "one and only one" unless specifically so stated, but rather "one or more."

All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether or not such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

APPENDIX A

The projection algorithm presented in the present disclosure makes a slight approximation by assuming that the mirror diffuses light from a ray of the projector into a fan of light within a vertical plane. However, these fans of light are generally conical in shape. The reflectance properties of an anisotropic surface can be simulated as small parallel cylindrical micro-facets aligned with dominant is of anisotropy $\vec{\alpha}$. In the setup described in the present disclosure, $\vec{\alpha}$ is a horizontal vector in the plane of the mirror. A projector ray striking a cylindrical micro-facet will be specularly reflected at a mirror angle along the cylinder tangent. The reflected light forms a cone whose angle at the apex is equal to the angle of incidence. The reflected light forms a plane in the special case where the incident light is perpendicular to the dominant anisotropic axis. As the video projector described in the present disclosure is mounted vertically relative to the mirror with a relatively narrow field of view, the projector rays always hit the mirror at close to 90 degrees yielding extremely wide cones. Furthermore, the cones are tangent to the ideal vertical plane in the vicinity of rays $\vec{P'Q}$, making these planes close approximations to the reflect fans of light in our setup. The step that involves reflecting the projector through the plane of the mirror also implicitly makes this assumption, but again the effects are minimal with the configuration described in the present disclosure. Errors would appear as a narrowing of the horizontal perspective at extremely high and low viewpoints. Analytically intersecting a cone with the viewing circle V is possible but computationally expensive, requiring solving a higher-order polynomial equation. In practice, a look-up table could be employed to correct for the small projection errors introduced by the conical reflection.

APPENDIX B

Vertex Shader Code

The following CG shader code projects a 3D scene vertex into projector coordinates as described in the present disclosure. It assumes helper functions are defined for basic geometric intersection operations.

```
void rasterVS(
float4 Q                       : POSITION,    // vertex position
float4 Qcol                    : COLOR0,     // vertex color
uniform float4x4 ModelViewProj,              // projector transform
uniform float4 P,                            // reflected projector position P'
uniform float d,                             // view radius
uniform float h,                             // view height
uniform float4 mirror_norm,                  // normal of mirror plane
out float4 oQ                  : POSITION,
out float4 oQcol               : COLOR0 )
    {
        // define ray from reflected projector position P' to vertex Q
        float4 PQ           = Q - P;
        PQ = normalize(PQ);
        // compute intersection of ray PQ with vertical cylinder with
        // radius d to find view position V'
        V = RayCylinderIntersection(PQ, d);
        V.y = h; // set correct viewer height
        // define ray from ideal viewing position V' to vertex Q
        float4 VQ = Q - V;
        VQ = normalize(VQ);
        // compute intersection ray VQ with mirror plane to find point M
        float4 M = RayPlaneIntersection(VQ, mirror_norm);
        oQ = mul( ModelViewProj, M ); // project M into projector
        oQcol = Qcol;            // keep the existing vertex color
        // recompute depth in based on distance from V'
        oQ.z = length(V - Q) / (2 * length(V - M));
    }
```

What is claimed is:

1. A system for generating an autostereoscopic 3D display of an object, comprising:
  an anisotropic surface configured to rotate about an axis and to cause two dimensional video images that are directed against the anisotropic surface to be narrowly spread within a first projection plane and to be widely spread within a second projection plane that is substantially perpendicular to the first projection plane;
  a motor configured to rotate the anisotropic surface about the axis;
  a single video projector configured to project two dimensional video images of the object onto the anisotropic surface while the anisotropic surface is spinning and the video projector is substantially stationary; and
  a processing system interfaced with the video projector and configured to cause the two dimensional video images that are projected by the video projector onto the spinning anisotropic surface to appear as an autosteroscopic 3D image of the object that faithfully changes in perspective as a viewer views the rotating anisotropic surface from different angles within a first viewing plane within a viewing space V, without the viewer having to wear any special glasses or headgear.

2. The system of claim 1, wherein the anisotropic surface is a holographic diffuser.

3. The system of claim 1, wherein the anisotropic surface is a lenticular lens.

4. The system of claim 1, wherein the anisotropic surface is a lenslet array.

5. The system of claim 1, wherein the processing system is configured to cause the 3D image of the object to be rendered by tracing the light rays into corresponding viewpoints in the viewing space V.

6. The system of claim 5, wherein each pixel in the video images is represented by a corresponding light ray of the video images, and wherein the processing system is configured to cause the 3D image of the object to be rendered by projecting each pixel in the video signals onto a corresponding viewpoint in the viewing space V, in a way that the projected pixel displays an appropriate part of the object as seen from the viewpoint so as to obtain the correct perspective for that viewpoint.

7. The system of claim 6, wherein for a viewpoint located at a height h relative to the center of the projection surface and a distance d from the vertical axis, the processing system is configured to obtain the correct perspective for that viewpoint by:
  defining a position P' that represents a reflection of a position P of the video projector across the plane of the mirror, at a given position of the spinning anisotropic surface;
  determining a viewpoint V' on the viewspace V from which a point Q on the object will be seen, by tracing a ray from the position P' of the video projector through each point Q, for each orientation of the spinning anisotropic surface;
  tracing a ray from the viewpoint V' toward Q until the ray intersects the surface of the anisotropic surface at a point M on the anisotropic surface, where M is the point on the anisotropic surface that reflects light to the viewer coming from the direction of Q; and projecting the point M up toward the position P to find a corresponding projector pixel coordinate (u,v) for each point Q.

8. The autostereoscopic system of claim 1, wherein the processing system is further configured to render MCOP (multiple center of projection) images of the object from the redirected light rays so as to pre-correct for distortions introduced when the light rays of video images are reflected and redirected from the projection surface of the spinning anisotropic surface and when the light rays are traced into one or more viewing directions in the field of view.

9. The autostereoscopic system of claim 1, wherein the processing system is further configured to interactively update the displayed images of the object in real time.

10. The system of claim 9, further comprising a tracking system configured to track the position of the viewer in real time, and wherein the processing system is further configured to receive information indicative of the position of the viewer in real time from the tracking system and, in response, to cause the two dimensional video images that are projected onto the spinning anisotropic surface to a ear as an autostereoscopic 3D image of the object that faithfully changes in perspective as the viewer views the rotating anisotropic surface from different angles within a second viewing plane that is substantially perpendicular to the first viewing plane.

11. The system of claim 10, wherein the tracking system includes a magnetic tracking device configured to track the position of the viewer when held by or attached to the viewer.

12. The system of claim 10, wherein the tracking system includes one or more video cameras configured to observe a plurality of viewers and is configured to track the position of each of the viewers.

13. The system of claim 10, wherein the tracking system includes one or more depth cameras configured to track the position of each of a plurality of viewers.

14. The system of claim 10 wherein the first viewing plane is substantially horizontal and the second viewing plane is substantially vertical.

15. The system of claim 1 wherein the first projection and viewing planes are substantially horizontal and the second projection plane is substantially vertical.

16. The system of claim 1 wherein the processing system is configured to cause the two dimensional video images that are projected by the video projector onto the spinning anisotropic surface to appear as an autostereoscopic 3D image of the object that faithfully changes in perspective as the viewer views the rotating anisotropic surface from substantially any angle within the first viewing plane without the viewer having to wear any special glasses or headgear.

17. The system of claim 1 wherein the anisotropic surface includes an anisotropic reflector attached to a surface of a mirror.

18. A system for generating an autostereoscopic 3D display of an object, comprising:
    a 3D, autostereoscopic, display system configured to render an autostereoscopic 3D image of the object that faithfully changes in perspective as a viewer views the display from different angles within a first viewing lane, without the viewer having to wear any special glasses or headgear;
    a tracking system configured to track the position of the viewer in real time; and
    a processing system configured to receive information indicative of the position of the viewer in real time from the tracking system and, in response, to cause the display system to render an autostereoscopic 3D image of the object that faithfully changes in perspective as the viewer views the rotating anisotropic surface from different angles within a second viewing plane that is substantially perpendicular to the first viewing plane, without the viewer having to wear any special lasses or headgear.

19. The system of claim 18 wherein:
    the tracking system is configured to track the positions of multiple viewers simultaneously in real time while at different positions; and
    the processing system configured to receive information indicative of the position of each of the viewers in real time from the tracking system and, in response, to cause the display system to render an autostereoscopic 3D image of the object that, for each of the viewers, faithfully changes in perspective as the viewer views the rotating anisotropic surface from different angles within a second viewing plane that is substantially perpendicular to the first viewing plane.

20. The system of claim 18 wherein the processing system is configured to cause the autosteroscopic 3D image of the object to faithfully change in perspective as the viewer views the display from substantially any angle within the first viewing plane without the viewer having to wear any special glasses or headgear.

* * * * *

UNITED STATES PATENT AND TRADEMARK OFFICE
CERTIFICATE OF CORRECTION

| | |
|---|---|
| PATENT NO. | : 8,432,436 B2 |
| APPLICATION NO. | : 12/105120 |
| DATED | : April 30, 2013 |
| INVENTOR(S) | : Paul E. Debevec et al. |

It is certified that error appears in the above-identified patent and that said Letters Patent is hereby corrected as shown below:

In the Claims

At col. 14, line 12, "lane," should read --plane--.

At col. 14, line 25, "lasses," should read --glasses--.

Signed and Sealed this
Twelfth Day of November, 2013

Teresa Stanek Rea
*Deputy Director of the United States Patent and Trademark Office*